United States Patent
Hartley et al.

(10) Patent No.: US 12,438,828 B2
(45) Date of Patent: Oct. 7, 2025

(54) SYSTEMS AND METHODS FOR BROKERING DEVICE COMMUNICATIONS WITHIN DISTRIBUTED PUBLISHER-SUBSCRIBER NETWORKS

(71) Applicant: GM GLOBAL TECHNOLOGY OPERATIONS LLC, Detroit, MI (US)

(72) Inventors: Steven Hartley, Pointe-Claire (CA); Frank Ghenassia, Ramat Gan (IL); Manohar S. Nemilikonda, Cumming, GA (US)

(73) Assignee: GM Global Technology Operations LLC, Detroit, MI (US)

( * ) Notice: Subject to any disclaimer, the term of this patent is extended or adjusted under 35 U.S.C. 154(b) by 380 days.

(21) Appl. No.: 18/171,519

(22) Filed: Feb. 20, 2023

(65) Prior Publication Data
US 2024/0283751 A1 Aug. 22, 2024

(51) Int. Cl.
*H04L 49/201* (2022.01)
*H04L 43/10* (2022.01)
*H04L 67/562* (2022.01)

(52) U.S. Cl.
CPC ............ *H04L 49/201* (2013.01); *H04L 43/10* (2013.01); *H04L 67/562* (2022.05)

(58) Field of Classification Search
CPC ..... H04L 67/141; H04L 67/14; H04L 67/145; H04L 49/201; H04L 43/10; H04L 67/562
USPC .................................. 370/390; 709/224, 223
See application file for complete search history.

(56) References Cited

U.S. PATENT DOCUMENTS

| | | | |
|---|---|---|---|
| 10,708,360 B2* | 7/2020 | Venkatesan | H04L 12/2836 |
| 10,812,600 B1* | 10/2020 | Naaman | H04L 67/141 |
| 10,833,881 B1* | 11/2020 | Jindal | H04L 63/102 |
| 2017/0332421 A1* | 11/2017 | Sternberg | H04L 12/4641 |
| 2018/0167476 A1* | 6/2018 | Hoffner | H04L 67/55 |
| 2018/0248804 A1* | 8/2018 | Nandy | H04L 67/1001 |

* cited by examiner

Primary Examiner — Jungwon Chang
(74) Attorney, Agent, or Firm — Quinn IP Law

(57) ABSTRACT

A method and system for brokering cloud event (CE) communications between a plurality of devices operable within a distributed publisher-subscriber system. The brokering may include constructing a plurality of publisher-subscriber connections between the devices and a gateway, and in response to receiving a plurality of publish packets at the gateway, relaying the publish packets from the gateway via the connection associated with a topic identified therein.

20 Claims, 2 Drawing Sheets

SYSTEMS AND METHODS FOR BROKERING DEVICE COMMUNICATIONS WITHIN DISTRIBUTED PUBLISHER-SUBSCRIBER NETWORKS

INTRODUCTION

The present closure relates to methods and systems for brokering communications between devices deployed within a distributed publisher-subscriber system, such as to broker bi-directional, publisher-subscriber exchange of cloud events (CEs) between the devices.

A software defined entity may correspond with a class or type of entity manufactured to perform various operations, processes, functions, etc., with at least some of those capabilities being at least partially instantiated in software. Given the variety of such manufacturers, the design and development of software defined entities may be made according to disparate operating systems and hardware constructs (e.g., vehicle mechatronics, vehicle high-compute, mobile phones, and the cloud, etc.). The software defined entities may rely upon proprietary software, development, deployment, and communications platforms. The present disclosure, accordingly, foresees a need for distributed software entities and/or those running in different environments to seamlessly discover, connect, and communicate CEs with each other in a transparent, simplified, and secure manner.

SUMMARY

One non-limiting aspect of the present disclosure relates to enabling software defined entities within a distributed publisher-subscriber system to seamlessly discover, connect, and communicate with each other via publisher-subscriber configured connections. The connections may be constructed with a gateway operable for brokering bi-directional, publisher-subscriber exchange between the devices of events, messages, information, data, etc., which may be collectively referred to for non-limiting purposes as cloud events (CEs) due to the capabilities of the present disclosure to facilitate the communication thereof ubiquitously as if communicated within a cloud computing infrastructure. The connections may be kept open to provide secure, bi-directional, broker-based communication channels between the devices, optionally with the gateway sharing the cloud events using publisher-subscriber messaging techniques and protocols.

One non-limiting aspect of the present disclosure relates to method for brokering communications between a plurality of devices within a distributed publisher-subscriber system. The method may include constructing a plurality of publisher-subscriber connections between the devices and a gateway, with each connection operable for supporting communications between the gateway and a corresponding one of the devices, and associating a topic with each of the connections, with each topic identifying the device associated therewith. The method may further include receiving a plurality of publish packets at the gateway. Each publish packet may be transmitted from one of the devices via a corresponding one of the connections and include a payload having both of a cloud event (CE) for publication and a topic subscribed to by another one of the devices. The method may yet further include relaying the publish packets from the gateway via the connection associated with the topic identified in the payload thereof, optionally with the publish packets relayed from the gateway including at least a portion of the payload received at the gateway.

The method may include associating the topics with the connections using a subscription manager operating on the gateway, optionally with the subscription manager cross-referencing a list of topics subscribed to by the devices with a list of the devices associated with each of the connections.

The method may include each publish packet received at the gateway including a header identifying the gateway as a topic.

The method may include, before relaying each publish packet from the gateway, replacing the topic identified in the header with the topic identified in the payload, the topic identified in the header differing from the topic identified in the payload.

The method may include the topic in the header of each publish packet relayed from the gateway identifying the device intended to be in receipt thereof.

The method may include the subscription manager generating the list of topics according to topics identified in a payload of subscribe packets transmitted from the devices to the gateway via the connections.

The method may include constructing each connection in response to the gateway receiving a connect packet from the device associated therewith and exchanging keep-alive information between the gateway and the devices to keep the connections open.

The method may include identifying one or more of the devices failing to exchange the keep-alive information with the gateway and deconstructing the connections associated with the devices failing to exchange the keep-alive information.

The method may include unicasting each publish packet from the gateway such that each publish packet is relayed via no more than one of the connections, thereby requiring the gateway to receive separate publish packets for each device subscribed thereto.

The method may include, at a first device receiving a first publish packet from the gateway, the first device being one of the devices and the first publish packet being one of the publish packets, multicasting at least a portion of the payload of the first publish packet to at least two applications operating thereon that subscribed to the topic identified in the header thereof.

The method may include determining the two applications with a first subscription manager operating on the first device, with the first subscription manager selecting the two applications from an application subscriber list maintained by the first subscription manager to identify the topics subscribed to by a plurality of applications operating thereon.

The method may include, at a second device of the devices transmitting the first publish packet to the gateway for relay to the first device, determining the topic identified in the header and the topic identified in the payload with a second subscription manager operating thereon.

The method may include the second subscription manager identifying for the first publish packet the gateway as the topic in the header and the first device as the topic in the payload.

One non-limiting aspect of the present disclosure relates to method for brokering communications between a plurality of devices. The method may include constructing a plurality of connections between the devices and a gateway, associating a topic with each of the connections, and receiving a plurality of publish packets. Each publish packet may be transmitted from one of the devices via a corresponding one of the connections and include a header identifying the gateway as a topic and a payload having both of a cloud event (CE) for publication and a topic subscribed to by another one of the devices. The method may further include relaying the publish packets from the gateway via the connection associated with the topic identified in the payload thereof, including replacing the topic identified in the header of the received publish packets with the topic identified in the payload before relaying the publish packet such that the topic in the header of each publish packet relayed from the gateway identifies the device intended to be in receipt thereof.

The method may include unicasting each publish packet from the gateway such that each publish packet is relayed via no more than one of the connections, thereby requiring the gateway to receive separate publish packets for each device subscribed thereto.

The method may include, at a first device receiving a first publish packet from the gateway, the first device being one of the devices and the first publish packet being one of the publish packets, multicasting at least a portion of the payload of the first publish packet to at least two applications operating thereon that subscribed to the topic identified in the header thereof.

The may include constructing each connection in response to the gateway receiving a connect packet from the device associated therewith and exchanging keep-alive information between the gateway and the devices to keep the connections open.

One non-limiting aspect of the present disclosure relates to a system for brokering communications. The system may include a plurality of devices operable for executing publisher-subscriber communications. The system may further include a gateway configured for constructing a plurality of publisher-subscriber connections between the devices, each connection operable for supporting communications between the gateway and a corresponding one of the devices; associating a topic with each of the connections, each topic identifying the device associated therewith; receiving a plurality of publish packets, each publish packet transmitted from one of the devices via a corresponding one of the connections, each published packet including a header identifying the gateway as a topic and a payload having a cloud event (CE) for publication and identifying a topic subscribed to by another one of the devices; and relaying the publish packets from the gateway via the connection associated with the topic identified in the payload thereof.

The gateway may be configured for replacing the topic identified in the header of the received publish packets with the topic identified in the payload before relaying the publish packet, the topic in the header of each publish packet relayed from the gateway identifying the device intended to be in receipt thereof.

The gateway may be configured for: constructing each connection in response to the gateway receiving a connect packet from the device associated therewith; exchanging keep-alive information between the gateway and the devices to keep the connections open; and deconstructing the connections associated with the devices failing to exchange the keep-alive information.

The above features and advantages along with other features and advantages of the present teachings are readily apparent from the following detailed description of the modes for carrying out the present teachings when taken in connection with the accompanying drawings. It should be understood that even though the following Figures and embodiments may be separately described, single features thereof may be combined to additional embodiments.

BRIEF DESCRIPTION OF THE DRAWINGS

The accompanying drawings, which are incorporated into and constitute a part of this specification, illustrate implementations of the disclosure and together with the description, serve to explain the principles of the disclosure.

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
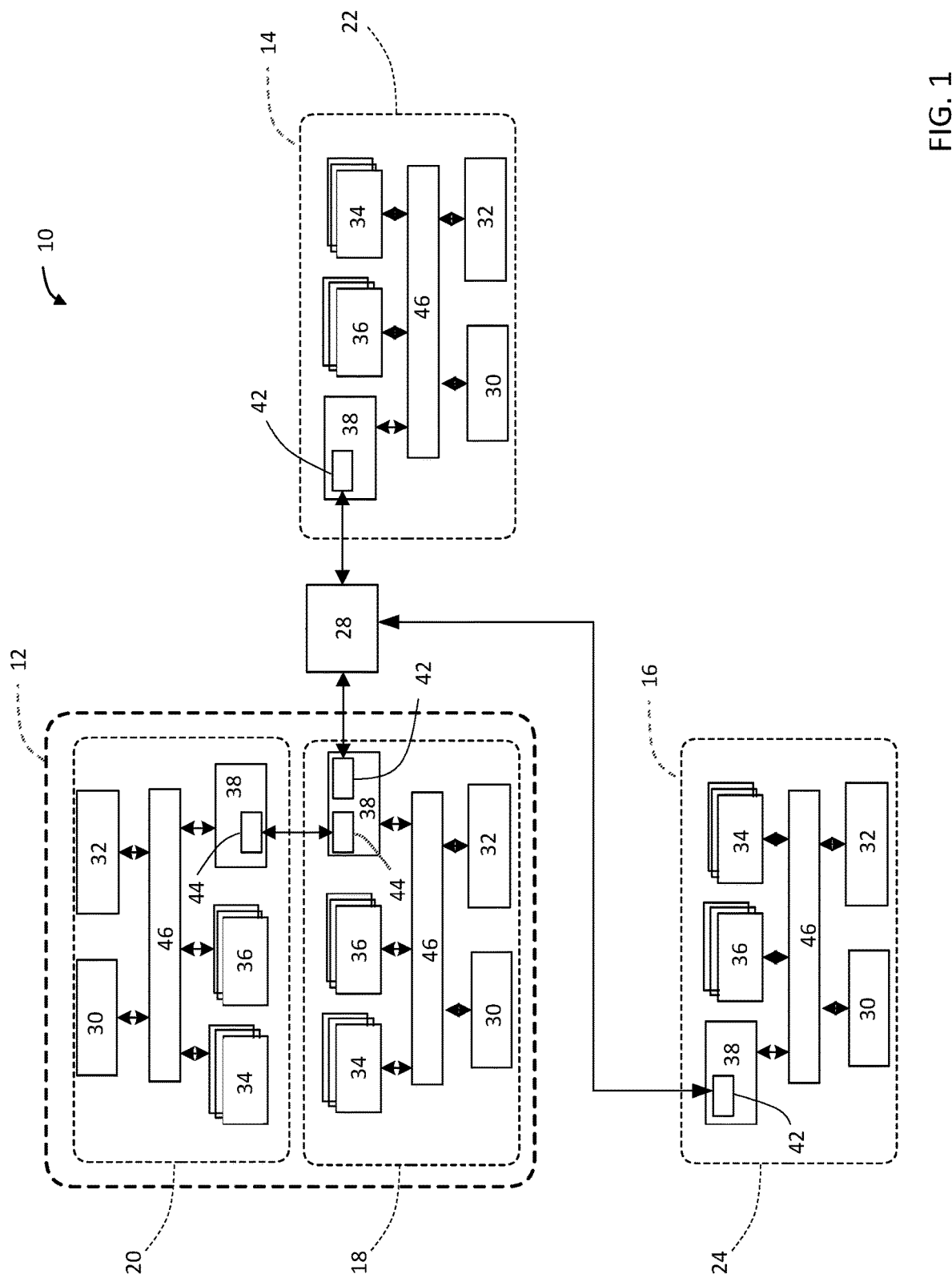
FIG. 1 illustrates a distributed publisher-subscriber system in accordance with one non-limiting aspect of the present disclosure.

FIG. 1 illustrates a distributed publisher-subscriber system 10 in accordance with one non-limiting aspect of the present disclosure. The system 10 may be configured to communicate events, data, information, messages, packets, etc., which may be collectively and generically referred to as cloud events (CEs), between a plurality of entities 12, 14, 16, such as but not necessarily limited to facilitating publisher-subscriber event related communications between software defined entities 12, 14, 16. One non-limiting aspect of the present disclosure contemplates the software defined entities 12, 14, 16 being devices included on vehicles, mobile phones, servers, etc. in need of a highly scalable way for communicating events between software defined devices 18, 20, 22, 24 thereon. The system 10 may be correspondingly configured to enable such devices 18, 20, 22, 24 to discover, connect, and communicate with each other in a secure and simple manner. The system 10 may enable the software defined entities to seamlessly discover, connect, and communicate CEs with each other via publisher-subscriber configured connections constructed with a gateway.

The gateway may be operable for brokering bi-directional, publisher-subscriber exchange of the CEs between the devices to facilitate the communication thereof ubiquitously as if communicated within a cloud computing infrastructure. A plurality of connections may be kept open between the devices and the gateway to facilitate sharing of the CEs using publisher-subscriber messaging techniques and protocols to provide secure, bi-directional, broker-based communication channels between the devices. The system 10, for example, may be configured to implement the distributed publisher-subscriber arrangement with the incorporation of publisher-subscriber related messaging protocols and techniques, and advantageously, without requiring a central broker typically employed in publisher-subscriber arrangements. The system 10 may instead be configured to provide a type of publisher-subscriber architecture whereby each device 18, 20, 22, 24 may be configured to include a subscription manager 32 to manage the publisher-subscriber communications.

The subscription managers 32 may be independently operable to define rules and other parameters for controlling CE communications between devices 18, 20, 22, 24 according to publisher-subscriber related methodologies. The subscription managers 32 and the other features described herein may act in concert to effectively provide multiple, distributed brokers, as opposed to a singular or central subscription manager or broker. While the present disclosure fully contemplates the distributed broker architecture being implemented according to other messaging constructs beside publisher-subscriber, the leveraging of publisher-subscriber principles as described herein is believed to be particular advantageous in enabling the system 10 to scale according to the communication needs of thousands and thousands of devices 18, 20, 22, 24 expected to rely upon the contemplated CE communications for software defined operations.

One aspect of the present disclosure contemplates at least a portion of the devices 18, 20, 22, 24 being included on vehicles whereby it may be advantageous for the related vehicle manufacturers to instantiate the devices 18, 20, 22, 24 for various vehicle related operations, such as but not necessarily limited to facilitate vehicle operations associated with a virtual cockpit unit (VCU), an electronic control unit (ECU), a telematics unit (TU), an advanced driver assistance system (ADAS), an engine control module (ECM), a braking control system (BCS), a battery management system (BMS), a navigation system, an ADAS compute platform (ACP), compute cluster unit (CCU), connectivity hub module (CHM), etc. The vehicles may include multiple devices 18, 20, 22, 24 onboard to provide the vehicle operations, optionally with different devices 18, 20, 22, 24 being tasked with implementing or otherwise supporting different vehicle operations. The vehicles, accordingly, may include a plurality of devices 18, 20, 22, 24 configured to facilitate various vehicle functions in a software defined manner. The devices 18, 20, 22, 24 may be characterized as having independent execution environments and/or software components for implementing the processes, etc. contemplated herein.

Given the sensitivity and the ability of the devices 18, 20, 22, 24 to influence vehicle operations, particularly those influential in driving or otherwise operating the vehicle, one non-limiting aspect of the present disclosure contemplates the vehicles including a firewall or other security measure to limit communication with the devices 18, 20, 22, 24. The security measures may include hiding the devices 18, 20, 22, 24 behind a firewall from external influences and communications originating outside of the system 10. The firewall may be beneficial in thwarting outside equipment from establishing device level communications with the devices 18, 20, 22, 24. The disclosure accordingly contemplates a desirability for hiding the devices 18, 20, 22, 24 while also enabling the devices 18, 20, 22, 24 to communicate with devices 18, 20, 22, 24 onboard other vehicles and/or with devices 18, 20, 22, 24 onboard external servers, services, etc. The system 10, for example, may enable a portion of the devices 18, 20, 22, 24 to be included onboard a plurality of vehicles and a portion of the devices 18, 20, 22, 24 to be included offboard the vehicles onboard other software defined entities, such as but not limiting to a back office (BO), a third party vendor, a server, or other external element.

Such non-vehicle or offboard devices 18, 20, 22, 24, for example, may be tasked with managing or assisting operations of the devices 18, 20, 22, 24 onboard the vehicles and/or such offboard devices 18, 20, 22, 24 may be configured to implement their own functionality and operations based on activities of the devices 18, 20, 22, 24 onboard the vehicles. The system 10 contemplated herein may be beneficial in enabling both onboard and offboard devices 18, 20, 22, 24, and as such, the differentiation between onboard and offboard devices 18, 20, 22, 24 is presented for non-limiting purposes to illustrate an implementation of the system 10 whereby the communication of CEs may occur between different types of software defined entities employing the devices 18, 20, 22, 24. FIG. 1 illustrates an exemplary arrangement where a vehicle may include multiple devices 18, 20 configured for communicating CEs with each other, as well as with additional devices 22, 24, which for exemplary purposes may respectively correspond with a back office or other remote server and a mobile phone associated with an owner or other entity related to the vehicle. This exemplary arrangement is presented for non-limiting purposes.

The devices 18, 20, 22, 24 may include one or more applications 34. The applications 34 may perform the role of a subscriber configured to consume CEs (e.g., data, information, etc.), which the application 34 may in turn use to facilitate executing a corresponding application 34, process, function, etc. The devices 18, 20, 22, 24 may additionally or alternatively include one or more services 36. The services 36 may perform the role of a producer configured to publish CEs (e.g., data, information, etc.), which the services 36 may in turn distribute for consumption by the applications 34 or other entities. For presentation simplicity, and without limitation, the CEs consumed by the applications 34 and produced by the services 36 may be referred to as subscribed CEs when consumed by one of the applications 34 and published CEs when produced by one of the services 36. The same CE may be considered as a published CE when being published by a service 36 and as a subscribed CE when being consumed by an application 34.

The devices 18, 20, 22, 24 may include the subscription manager 32 to manage a plurality of subscriptions for the associated device 18, 20, 22, 24. The subscriptions may be configured for identifying one or more subscribed topics and one or more published topics for the associated device 18, 20, 22, 24, or more specifically, for the applications 34 and/or the services 36 thereon. The subscriptions may accordingly define topics for the CEs to be communicated to the applications 34 and from the services 36 on a per device 18, 20, 22, 24 basis. The topics may be defined according to categories, groups, data types, etc. relevant thereto. In this manner, the applications 34 may individually subscribe to CEs defined by one or more topics, and the services 36 may similarly subscribe to providing CEs for one more topics. Each of the devices 18, 20, 22, 24 may be configured to include the subscription manager 32 such that the subscription managers 32 may be locally distributed throughout the system 10 at each of the devices 18, 20, 22, 24. The subscription managers 32 may be configured in this manner to manage the publisher-subscriber design pattern for the associated device, beneficially eliminating a need for the devices 18, 20, 22, 24 to rely upon a central broker to support the publisher-subscriber design pattern.

The subscription managers 32 may be distinguished from a discovery manager 30 included on the devices 18, 20, 22, 24. The discovery manager 30 may be configured for the devices 18, 20, 22, 24 to discover each other, their location (address), properties, etc. The devices 18, 20, 22, 24 may include a streamer 38 configured to provide wired and/or wireless communications. The streamer 38 may be configured with a device-to-cloud (D2C) or a device-to-gateway (D2G) interface 42 to provide device level communications with a network offboard of the vehicle or other entity 12, 14, 16 and a device-to-device (D2D) interface 44 configured to provide device level communications with another device onboard the same vehicle or entity 12, 14, 16. The capabilities of the streamer 38 to provide communications with other devices 18, 20, 22, 24 onboard the same vehicle or entity may be beneficial in establishing a domain, which may be used to establish a collection of devices 18, 20 capable of being associated with a common Domain Name System (DNS) or other type of nomenclature.

The devices 18, 20, 22, 24 may include a dispatcher 46 configured to manage communications between the applications 34, services 36, subscription manager 32, and streamer 38. The dispatcher 46 may be configured to inspect, package, alter, and otherwise add data to and/or remove data from CEs and/or other messages or packets communicated thereover, including capabilities for appending sink attributes and removing sink attributes when unicasting and multicasting CEs between devices 18, 20, 22, 24 and/or applications 34 or services 36. The present disclosure fully contemplates the devices 18, 20, 22, 24 having alternative configurations and capabilities, such as those that may be prevalent with various types of software defined entities. The foregoing, accordingly, is presented for non-limiting purposes to highlight features that may be beneficial in brokering bi-directional, publisher-subscriber exchange of CEs between the devices 18, 20, 22, 24 via a persistent plurality of connections established with the gateway 28 without the use of a singular or central broker.

Figure 2:
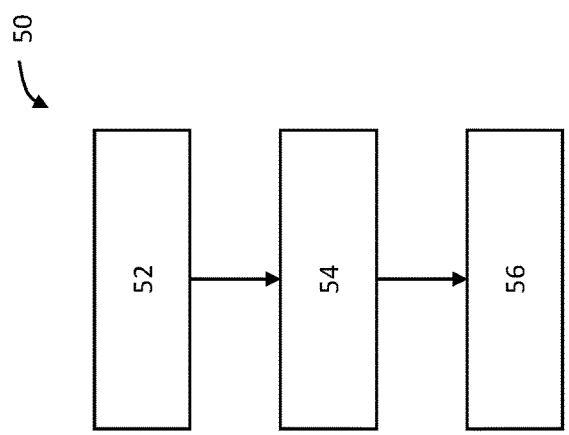
FIG. 2 illustrates a flowchart of a method for brokering communications in accordance with one non-limiting aspect of the present disclosure.

FIG. 2 illustrates a flowchart 50 of a method for brokering communications in accordance with one non-limiting aspect of the present disclosure. Block 52 relates to a publisher-subscriber registration process for the applications 34 and services 36 to register for CEs. The registration process may include the applications 34 and services 36 at each device 18, 20, 22, 24 exchanging registration information with the subscription manager 32 thereon, such as by exchanging messages therewith using the dispatcher 46. The applications 34 may register with the subscription manager 32 for topics associated with desired CEs, such as CEs produced by the services 36 on the same device 18, 20, 22, 24 and/or the CEs produced by the services 36 operating on other devices 18, 20, 22, 24. The disclosure contemplates various types of applications 34 and services 36 operating on the devices 18, 20, 22, 24, and as such, the exemplary applications and services 34, 36 described with respect to the method herein are not intended to be limiting. The registration process may include the subscription managers 32 maintaining lists or other construct sufficient for representing the topics subscribed to by the applications and services 34, 36.

The applications 34 onboard the vehicle 12 and the mobile phone 16 may include a notification application 34 configured to provide notification to vehicle occupants, a navigation application 34 configured to facilitate navigating the vehicle, such as according to information from a global positioning system (GPS), an infotainment application 34 configured to facilitate multi-media interactions with vehicle occupants, etc. The applications 34 on the back office 14 may include a vehicle services application 34 for scheduling maintenance services 36 for vehicles, a trip planning application 34 for planning vehicle trips, a charging station application 34 for locating charging stations, etc. The services 36 may register with the subscription manager 32 to produced CEs, such as CEs each service 36 is configured to produce for consumption by the applications 34 and/or other entities. As with the applications 34, the present disclosure contemplates a wide variety of services 36. The services 36 associated with the vehicle 12 and the mobile phone 16, for example, may include a location service 36 configured for generating data representing a location of the vehicle 12. The services 36 on the back office 14 may include a maintenance notification service 36 for indicating when maintenance or software updates are needed, a location service 36 for indicating current location of the vehicles, etc.

The subscription managers 32 may determine application sink attributes for use with the corresponding dispatcher 46 to facilitate transmitting the CEs of the locally produced services 36 directly to the local applications 34 without routing through the gateway 28. The subscription list may likewise include device sink attributes for use with the corresponding dispatcher 46 to facilitate transmitting the CEs of the gateway for relay to one of the remote devices 18, 20, 22, 24 subscribing thereto. The device sink attributes may be insufficient for the gateway 28 to identify the individual applications 34 subscribing to the services 36, i.e., the device sink attributes may identify the device 18, 20, 22, 24 and not the individual applications 34 thereon. The registration process may include the subscription manager 32 on each device 18, 20, 22, 24 generating a publication list for each service 36 thereon, optionally with data representing the type, content, nature, etc. of the data being published by the corresponding services 36.

The subscription managers 32 on each device 18, 20, 22, 24 may be configured to facilitate communications with each other in order to apprise each other of the services 36 thereon. This exchange of subscription related information may be used to enable the subscription managers 32 to apprise the local applications 34 of services 36 available from local services 36 as well as the services 36 available from other devices 18, 20, 22, 24. One aspect of the present disclosure contemplates the subscription managers 32 sharing the subscription related information without providing sink attributes for the individual applications 34 and services 36, and instead, providing sink attributes for the associated device 18, 20, 22, 24. The subscription managers 32 may include application 34 and/or service 36 sink attributes for the local applications 34 and/or services 36 for purposes of facilitating message routing over the local dispatcher 46 and common or more generic device sink attributes for use in CE routing outside of the local device 18, 20, 22, 24.

The use of the device sink attributes instead of the application and/or service sink attributes when communicating from one device 18, 20, 22, 24 to another, remote device 18, 20, 22, 24 may be beneficial in ameliorating the quantity of CEs communicated from one device 18, 20, 22, 24 to another. In other words, when the receiving device 18, 20, 22, 24 includes multiple applications 34 requesting the same CE, a single instance of the corresponding CE may be unicast into the device 18, 20, 22, 24 whereupon the CE may be multicasted to multiple applications 34 operating thereon. Rather than transmitting the same CE multiples times from one device 18, 20, 22, 24 to each application 34 on the receiving device 18, 20, 22, 24, the present disclosure may unicast a singular instance of the CE to the receiving device 18, 20, 22, 24. A central broker type of system, in contrast, would need to multicast the CE separately from the originating device 18, 20, 22, 24 for each of the applications 34 on the receiving device 18, 20, 22, 24. The capabilities of the present disclosure to unicast a single CE from one device 18,

20, 22, 24 to another for subsequent multicasting thereat may be beneficial in limiting the consumption of network transmission resources.

Block 54 relates to a CE production process, which for exemplary and non-limiting purposes may be described with respect to a service 36 operating on the vehicle 12 generating a first CE, a service 36 operating on the back office 14 generating a second CE, and a service 36 operating on the mobile phone 16 generating a third CE. The CE generation process may occur concurrently on the devices 18, 20, 22, 24 at the vehicle 12, back office 14, and mobile phone 16 or in another sequence, such as with the devices 18, 20, 22, 24 generating the corresponding CEs at different times. The present disclosure notes the first, second, and third CEs to demonstrate advantageous capabilities of the present disclosure in leveraging the distributed capabilities of the subscription service 36 managers residing on the individual devices 18, 20, 22, 24 to facilitate distributed, publisher-subscriber CE communication. The communication may include communicating a single instance of the CE from one device 18, 20, 22, 24 to another regardless of the quantity of applications 34 on the receiving device requesting the same CE. The publisher-subscriber CE communication, at least in this regard, may be characterized by an originating device 18, 20, 22, 24 unicasting a CE to each subscribing device 18, 20, 22, 24, with the subscribing device 18, 20, 22, 24 thereafter multicasting the CE to each subscribing application 34 thereon.

Block 56 relates a CE communication process associated with facilitating publisher-subscriber communication of the CEs. The CE communication process may include the subscription managers 32 on the device 18, 20, 22, 24 producing or publishing the CEs determining one or more applications 34 subscribing thereto. The subscription managers 32 may be configured to identify the subscribing applications 34 in response to a request from the local dispatcher 46, e.g. the local dispatcher 46 may detect a service 36 publishing a CE and make an inquiry with the service 36 subscription manager 32 to ascertain where the CE should be communicated. In the event one or more local applications 34 are subscribing to a topic associated with the CE, the subscription manager 32 may provide an application sink attribute to the dispatcher 46 that the dispatcher 46 may then use to directly route the CE to the local application 34. In the event of one or more remote applications 34 on another device 18, 20, 22, 24 are subscribing to the topic associated with the CE, the subscription manager 32 may provide a device sink attribute to the dispatcher 46 for each of the devices 18, 20, 22, 24 having at least one subscribing application 34. The dispatcher 46 may then append the device sink attributes to CE for use in unicasting the CE separately to each of the devices 22, 24 having one of the subscribing applications 34.

Figure 3:
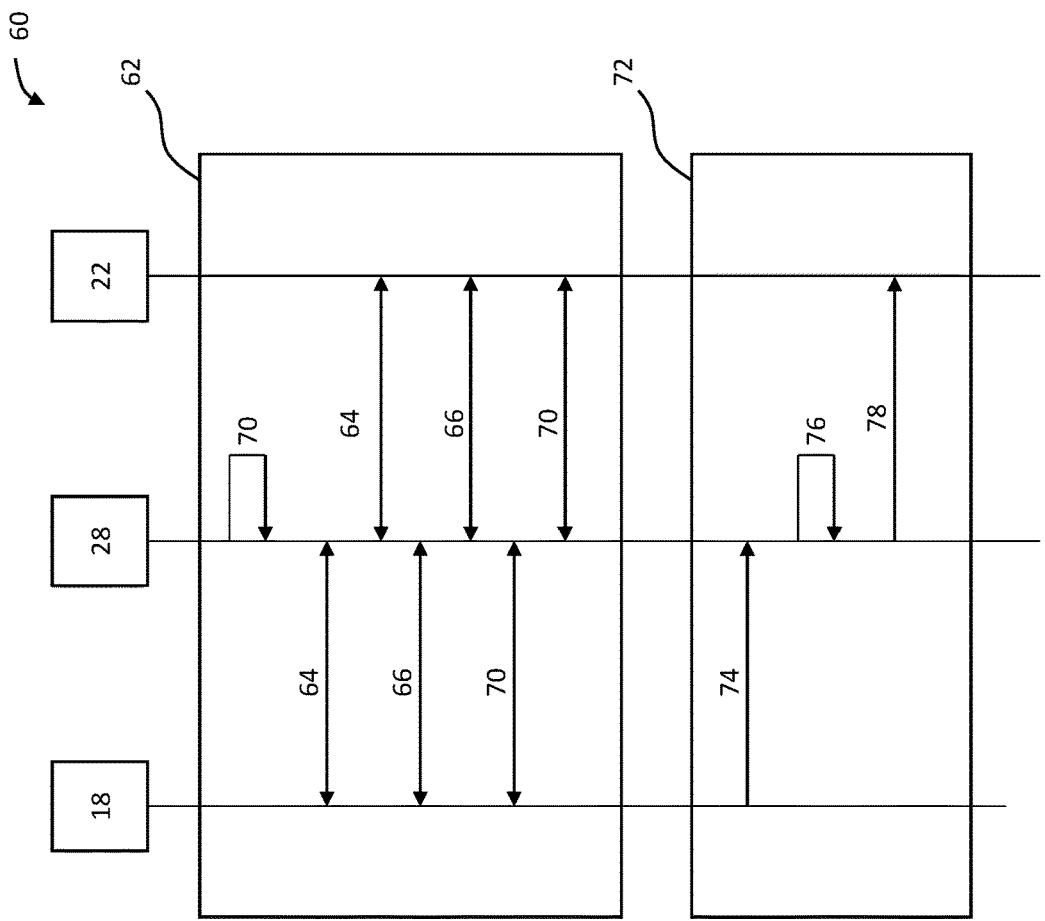
FIG. 3 illustrates a flowchart of a communication process in accordance with one non-limiting aspect of the present disclosure.

FIG. 3 illustrates a flowchart 60 of the CE communication process in accordance with one non-limiting aspect of the present disclosure. The contemplated brokering may include bi-directional, publisher-subscriber exchange of CEs between the devices 18, 20, 22, 24 via a persistent plurality of connections established with the gateway 28. Block 62 relates to a setup process for constructing the plurality of connections between the devices 18, 20, 22, 24 and the gateway 28. The connections may correspond with wired and/or wireless communication mediums capable of facilitating signal exchange via the gateway 28 between the devices, such as to the D2G interfaces 42. While more of the devices may operate similarly, the flowchart illustrates an exemplary scenario where a first device 18 and a second device 22 establish separate connections with the gateway. The first and second devices 18, 22 may correspondingly connect process 64 whereby each transmits a connect packet to and receives a connect acknowledgement (conack) packet from the gateway 28. The connect and conack packets may, for example, correspond with the type of connect and conack packets commonly employed in Message Queuing Telemetry Transport (MQTT) to construct connections. The connections may be sufficient for the devices 18, 22 to exchange packets with each other via the gateway 28.

Once the connections are constructed, the gateway 28 may implement a maintenance process 66 for maintaining the connections. The maintenance process 66 may be used to keep the corresponding connections open and available for purposes of communicating publisher-subscriber, CE packets thereover. The maintenance process 66 may include exchanging keep-alive information through the connections between the gateway 28 and the corresponding devices 18, 22 to ascertain whether the corresponding connection remains open. In the event the gateway 28 fails to receive keep-alive information from through one of the connections, it may be determined that that connection is no longer viable or needed whereupon it may be deconstructed. One non-limiting aspect of the present disclosure contemplates a need for active connections to be ongoing between the gateway 28 and the devices 18, 20, 22, 24 in order to support exchanging packets therebetween according to publisher-subscriber communication techniques. Due to such techniques optionally requiring the transmitting and receiving devices 18, 20, 22, 24 to be actively listening to one of the channels in order to exchange packets thereover, the ability to maintain connections in anticipation of CE related transmissions may be beneficial.

The gateway 28 may include a controller configured to facilitate the operations, processes, messaging, packet transmissions, etc. contemplated herein. As with the other logically executing features described herein, the controller may include a computer readable storage medium having a plurality of non-transitory instructions stored thereon, which when executed with an associated processor, may be sufficient for controlling the gateway 28 to facilitate the activities described herein. The controller may be configured to operate as a subscription manager having capabilities for maintaining a subscription list of topics subscribed to by the devices 18, 20, 22, 24. The first and second devices 18, 22 are shown to form a subscribed process 70 for transmitting subscribed packets to the gateway 28 for purposes of identifying a topic for subscription, which may be identified within a payload thereof. One non-limiting aspect of the present disclosure contemplates the first and second devices 18, 22 and the other devices 20, 24 designed to communicate via the gateway 28, to identify themselves as the topic for subscription. With respect to the first and second devices 18, 22, this may include including a unique identifier, client ID, or other information in the payload of the subscribe packet to identify itself as the topic.

The topics in the subscribe packets, for example, may be identified as "Device 1" to identify the first device 18 as the topic and "Device 2" to identify the second device 22 as the topic. The capability of the present disclosure to enable the devices 18, 20, 22, 24 to identify themselves as topics may be beneficial in brokering the communication of CEs via the gateway 28 using publisher-subscriber techniques. The gateway 28 may, such as via the gateway controller, may be configured to similarly undertake the subscribe process 72 to subscribe to itself, which is shown for exemplary purposes to correspond with generating a similar subscribe packet or otherwise making an entry in the subscription list for itself, such as by including "Gateway" as a topic. The subscription list kept at the gateway 28 may be used in this manner to control the gateway 28 to listen to any packets transmitted over the connections having a header identifying the gateway 28 as the topic. The subscription list may additionally be cross-referenced with a connection list or other tabulation for associating the connections with each of the corresponding devices 18, 20, 22, 24. The gateway 28 may use this information to make an association between the connections and the devices 18, 20, 22, 24 based on the subscribed topics.

Block 72 relates to a publish process for brokering the communication of a CE from the first device 18 to the second device 22 via the gateway 28. The publish process may include the first device 18 transmitting a publish packet 74 to the gateway 28 for relay to the second device 22. One non-limiting aspect of the present disclosure contemplates generating the published packets in a particular manner to facilitate publisher-subscriber the contemplated publisher-subscriber communications, which may occur by including multiple topics within the published packets. The publish packet, for example, may include a header in a payload, with the header identifying the gateway 28 as a topic e.g., by noting "Gateway" within a header topic field and the payload identifying the second device 22 as a topic, e.g., by noting "Device 2" within a payload topic field. The gateway 28 may receive the publish packet 74, and due to the topic in the header identifying a topic subscribed to by the gateway 28, i.e., by identifying itself, the gateway 28 may be configured to process the publish packet 74 for relay to the second device.

The gateway 28 may perform a relay process 76 for determining the second device 22 intended to be in receipt thereof. The relay process 76 may include the gateway 28 identifying the second device 22 based on the topic included within the payload thereof when received at the gateway, i.e., the "Device 2" identified within the payload of the publish packet 74 when received at the gateway 28. The gateway 28 may use the identify topic, i.e., "Device 2", to perform association or otherwise identify whether any existing connections have been created between the gateway 28 and the second device 22. This association may be performed by the gateway cross-referencing the subscription list with the connectionless to identify appropriate one of the plurality of connections associated with the second device 22. The gateway 28 may thereafter relay a corresponding publish packet 78 to the second device 22. The publish packet 78 may be similar to the publish packet 74 received at the 20 gateway 28, with the exception of the header having a topic identifying the second device 22 instead of the gateway 28. The relay process 76, for example, may correspond with the gateway 28, before relaying the publish packet 74, replacing the topic identified in the header with the topic identified in the payload such that the topic identified in the header of the relayed publish packet 78 differs from the topic previously identified in the header.

The publish packet 74 when received at the gateway 28 may include the CE or the data used to represent the CE. The CE may remain in the payload when the relayed publish packet 78 is relayed from the gateway 28 to the second device 22. The subscription list kept at the second device 22 may be used to listen for any packets transmitted over the connections having a header identifying the device 22 as the topic. As such, due to the relayed publish packet 78 having a head identifying the second device as the topic, the second device 22 may correspondingly process the relayed publish packet 78. This may include the subscription manager 32 at the second device 22 identifying one or more applications thereon subscribing to the CE. The subscription manager may thereafter, after cooperation with the dispatcher 46, append application sink attributes to the CE to facilitate multicasting the CE to the applications 34 operating thereon. A similar process may occur in reverse with the second device 22 desiring to transmit a publish packet to the first device 18 another one of the devices in communication with the gateway 28. In this manner, one non-limiting aspect of the present disclosure contemplates secure, bi-directional, broker-based communication channels between the devices 18, 20, 22, 24, optionally with the gateway 28 sharing the CEs using publisher-subscriber messaging techniques and protocols.

The terms "comprising", "including", and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any one and all combinations of the associated listed items. The term "any of" is understood to include any possible combination of referenced items, including "any one of" the referenced items. "A", "an", "the", "at least one", and "one or more" are used interchangeably to indicate that at least one of the items is present. A plurality of such items may be present unless the context clearly indicates otherwise. All numerical values of parameters (e.g., of quantities or conditions), unless otherwise indicated expressly or clearly in view of the context, including the appended claims, are to be understood as being modified in all instances by the term "about" whether or not "about" actually appears before the numerical value. A component that is "configured to" perform a specified function is capable of performing the specified function without alteration, rather than merely having potential to perform the specified function after further modification. In other words, the described hardware, when expressly configured to perform the specified function, is specifically selected, created, implemented, utilized, programmed, and/or designed for the purpose of performing the specified function.

While various embodiments have been described, the description is intended to be exemplary, rather than limiting and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims. Although several modes for carrying out the many aspects of the present teachings have been described in detail, those familiar with the art to which these teachings relate will recognize various alternative aspects for practicing the present teachings that are within the scope of the appended claims. It is intended that all matter contained in the above description or shown in the accompanying drawings shall be interpreted as illustrative and exemplary of the entire range of alternative embodiments that an ordinarily skilled artisan would recognize as implied by, structurally and/or functionally equivalent to, or otherwise rendered obvious based upon the included content, and not as limited solely to those explicitly depicted and/or described embodiments.

What is claimed is:

1. A method for brokering communications between a plurality of devices within a distributed publisher-subscriber system, the method comprising:
constructing a plurality of publisher-subscriber connections between the devices and a gateway, each of the publisher-subscriber connections being operable for supporting communications between the gateway and a corresponding one of the devices;
receiving a plurality of subscribe packets at the gateway from the devices after constructing the publisher-subscriber connections, each of the subscribe packets including a subscribe topic identifying the device from which the subscribe packet was received;
associating a respective one of the subscribe topics with each of the publisher-subscriber connections, each of the subscribe topics identifying the device associated therewith each of the publisher-subscriber connections;
receiving a plurality of publish packets at the gateway, each of the publish packets being transmitted from a producer one of the devices via a corresponding one of the publisher-subscriber connections, and each of the publish packets including a header identifying the gateway as a gateway topic and a payload having both a cloud event (CE) for publication and a publish topic subscribed to by a subscriber one of the devices different from the producer one of the devices;
identifying, for each of the received publish packets, which of the devices is the subscriber one of the devices by comparing the publish topic in the payload of the publish packet to each of the subscribe topics associated with each of the publisher-subscriber connections;
replacing the gateway topic in the header of the publish packet with the publish topic in the payload of the publish packet, the gateway topic identified in the header differing from the publish topic identified in the payload; and
relaying the publish packets from the gateway via the publisher-subscriber connections with the subscribe topics associated with the publish topics identified in the payloads of the publish packets, the publish packets relayed from the gateway including at least a portion of the payload received at the gateway.

2. The method according to claim 1, wherein associating the subscribe topics with the publisher-subscriber connections includes using a subscription manager operating on the gateway to cross-reference a list of topics subscribed to by the devices with a list of the devices associated with each of the publisher-subscriber connections.

3. The method according to claim 1, wherein the publish topic replacing the gateway topic in the header of each of the publish packets relayed from the gateway identifies the device intended to be in receipt of the publish packet.

4. The method according to claim 3, further comprising the subscription manager generating the list of topics according to topics identified in a subscribe packet payload of the subscribe packets transmitted from the devices to the gateway via the publisher-subscriber connections.

5. The method according to claim 4, further comprising:
receiving connect packets at the gateway from the devices, wherein constructing each of the publisher-subscriber connections is in response to the gateway receiving the connect packet from the device associated with the publisher-subscriber connection; and
exchanging keep-alive information between the gateway and the devices to keep the publisher-subscriber connections open.

6. The method according to claim 5, further comprising:
identifying one or more of the devices failing to exchange the keep-alive information with the gateway; and
deconstructing the publisher-subscriber connections associated with the devices failing to exchange the keep-alive information.

7. The method according to claim 5, wherein the publish packets are relayed by unicasting each of the publish packets from the gateway such that each of the publish packets is relayed via no more than one of the publisher-subscriber connections, thereby requiring the gateway to receive a separate one of the publish packets for each of the devices subscribed thereto.

8. The method according to claim 7, further comprising:
receiving, at a first device, a first publish packet from the gateway, the first device being one of the devices and the first publish packet being one of the publish packets; and
multicasting at least a portion of the payload of the first publish packet to at least two applications operating on the first device that subscribed to the publish topic identified in the header of the first publish packet.

9. The method according to claim 8, further comprising determining the two applications with a first subscription manager operating on the first device, the first subscription manager selecting the two applications from an application subscriber list maintained by the first subscription manager to identify the topics subscribed to by a plurality of applications operating on the first device.

10. The method according to claim 9, further comprising determining, at a second device of the devices transmitting the first publish packet to the gateway for relay to the first device, the topic identified in the header and the topic identified in the payload with a second subscription manager operating on the second device.

11. The method according to claim 10, further comprising the second subscription manager identifying for the first publish packet the gateway as the topic in the header and the first device as the topic in the payload.

12. A method for brokering communications between a plurality of devices, the method comprising:
constructing a plurality of connections between the devices and a gateway, each of the connections connecting the gateway to only one of the devices;
receiving a plurality of subscribe packets at the gateway from the devices after constructing the connections, each of the subscribe packets including a header containing a subscribe topic identifying the device from which the subscribe packet was received;
associating a respective one of the subscribe topics topic with each of the connections such that the respective subscribe topic identifies the device associated with the connection;
receiving a plurality of publish packets, each of the publish packets being transmitted from a producer one of the devices via a corresponding one of the connections, and each of the publish packets including a header identifying the gateway as a gateway topic and a payload having both a cloud event (CE) for publication and a publish topic subscribed to by a subscriber one of the devices different from the producer one of the devices;
identifying, for each of the received publish packets, which of the devices is the subscriber one of the devices by comparing the publish topic in the payload of the publish packet to each of the subscribe topics associated with each of the connections; and relaying the publish packets from the gateway via the connections with the subscribe topics associated with the publish topics identified in the payloads of the publish packets, including replacing the topic identified in the header of the received publish packets with the topic identified in the payload before relaying the publish packets such that the topic in the header of each of the publish packets relayed from the gateway identifies the device intended to be in receipt thereof.

13. The method according to claim 12, wherein the publish packets are relayed by unicasting each of the publish packets from the gateway such that each of the publish packets is relayed via no more than one of the connections, thereby requiring the gateway to receive a separate one of the publish packets for each of the devices subscribed thereto.

14. The method according to claim 13, further comprising:
receiving, at a first device, a first publish packet from the gateway, the first device being one of the devices and the first publish packet being one of the publish packets; and
multicasting at least a portion of the payload of the first publish packet to at least two applications operating on the first device that subscribed to the publish topic identified in the header of the first publish packet.

15. The method according to claim 12, further comprising:
receiving connect packets at the gateway from the devices, wherein constructing each of the connections is in response to the gateway receiving the connect packet from the device associated with the connection; and
exchanging keep-alive information between the gateway and the devices to keep the connections open.

16. A system for brokering communications, comprising:
a plurality of devices operable for executing publisher-subscriber communications; and
a gateway configured for:
constructing a plurality of publisher-subscriber connections with the devices, each of the publisher-subscriber connections being operable for supporting publisher-subscriber communications between the gateway and a corresponding one of the devices;
receiving a plurality of subscribe packets from the devices after constructing the publisher-subscriber connections, each of the subscribe packets including a subscribe topic identifying the device from which the subscribe packet was received;
associating a respective one of the subscribe topics with each of the publisher-subscriber connections, each of the subscribe topics identifying the device associated with each of the publisher-subscriber connections;
receiving a plurality of publish packets, each of the publish packets being transmitted from a producer one of the devices via a corresponding one of the publisher-subscriber connections, and each of the publish packets including a header identifying the gateway as a gateway topic and a payload having a cloud event (CE) for publication and identifying a publish topic subscribed to by a subscriber one of the devices different from the producer one of the devices;
identifying, for each of the received publish packets, which of the devices is the subscriber one of the devices by comparing the publish topic in the payload of the publish packet to each of the subscribe topics associated with each of the publisher-subscriber connections;
replacing the gateway topic in the header of the publish packets with the publish topic in the payload before relaying the publish packet, the publish topic replacing the gateway topic in the header of each of the publish packets relayed from the gateway identifying the device intended to be in receipt of the publish packet; and
relaying the publish packets from the gateway via the publisher-subscriber connections with the subscribe topics associated with the publish topics identified in the payloads of the publish packets.

17. The system according to claim 16, wherein the gateway is further configured for:
receiving connect packets at the gateway from the devices, wherein constructing each of the publisher-subscriber connections is in response to the gateway receiving a connect packet from the device associated with the publisher-subscriber connection;
exchanging keep-alive information between the gateway and the devices to keep the publisher-subscriber connections open; and
deconstructing the publisher-subscriber connections associated with the devices failing to exchange the keep-alive information.

18. The system according to claim 16, wherein associating the subscribe topics with the publisher-subscriber connections includes a subscription manager, operating on the gateway, cross-referencing a list of topics subscribed to by the devices with a list of the devices associated with each of the publisher-subscriber connections.

19. The system according to claim 16, wherein the publish packets are relayed by unicasting each of the publish packets from the gateway such that each of the publish packets is relayed via no more than one of the publisher-subscriber connections thereby requiring the gateway to receive a separate one of the publish packets for each of the devices subscribed thereto.

20. The system according to claim 16, wherein the gateway is further configured for:
receiving, at a first device, a first publish packet from the gateway, wherein the first publish packet is one of the publish packets; and
multicasting at least a portion of the payload of the first publish packet to at least two applications operating on the first device that subscribed to the publish topic identified in the header the first publish packet.

* * * * *